United States Patent
Stauffer et al.

(10) Patent No.: US 10,602,418 B2
(45) Date of Patent: Mar. 24, 2020

(54) HANDOVER OF A WIRELESS CONNECTION BASED ON UPLINK AND DOWNLINK SIGNAL QUALITIES

(71) Applicant: Google LLC, Mountain View, CA (US)

(72) Inventors: Erik Richard Stauffer, Sunnyvale, CA (US); Jibing Wang, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/004,780

(22) Filed: Jun. 11, 2018

(65) Prior Publication Data

US 2019/0380083 A1 Dec. 12, 2019

(51) Int. Cl.
*H04W 36/30* (2009.01)
*H04B 7/06* (2006.01)
*H04L 5/00* (2006.01)

(52) U.S. Cl.
CPC .......... *H04W 36/30* (2013.01); *H04B 7/0617* (2013.01); *H04L 5/0048* (2013.01)

(58) Field of Classification Search
CPC ..... H04W 36/30; H04B 7/0617; H04L 5/0048
See application file for complete search history.

(56) References Cited

U.S. PATENT DOCUMENTS

| | | | |
|---|---|---|---|
| 6,438,377 | B1 | 8/2002 | Savolainen |
| 9,264,961 | B1 | 2/2016 | Shah et al. |
| 2011/0183705 | A1 | 7/2011 | Tanno et al. |
| 2012/0026976 | A1 | 2/2012 | Chang et al. |
| 2012/0195284 | A1* | 8/2012 | Mann ................ H04W 28/16 370/329 |
| 2013/0083729 | A1* | 4/2013 | Xu ................ H04W 52/325 370/328 |
| 2013/0083774 | A1 | 4/2013 | Son et al. |
| 2013/0308473 | A1* | 11/2013 | Sun ................ H04W 36/30 370/252 |
| 2014/0369341 | A1 | 12/2014 | Jeong et al. |

(Continued)

FOREIGN PATENT DOCUMENTS

| | | |
|---|---|---|
| WO | 2016069163 | 5/2016 |
| WO | 2017133355 | 8/2017 |

(Continued)

OTHER PUBLICATIONS

"Final Office Action", U.S. Appl. No. 16/056,947, dated Apr. 23, 2019, 61 pages.

(Continued)

*Primary Examiner* — Andrew Lai
*Assistant Examiner* — Harry H Kim
(74) *Attorney, Agent, or Firm* — Colby Nipper (57) ABSTRACT

The present disclosure describes techniques and systems for handing over a connection of a user device, within a wireless network, based on qualities of downlink signals and qualities of uplink signals. These techniques and systems include a base station and a neighboring base station negotiating handover parameters, based on the qualities of downlink signals as detected by a user device and the qualities of uplink signals as detected by the base station and the neighboring base station. The base station and neighboring base station negotiate the handover parameters via an interface connecting the base station to the neighboring base station.

20 Claims, 8 Drawing Sheets

(56) References Cited

U.S. PATENT DOCUMENTS

| | | | |
|---|---|---|---|
| 2015/0201360 A1* | 7/2015 | Ray Chaudhuri | H04W 36/30 |
| | | | 455/436 |
| 2016/0119840 A1 | 4/2016 | Loehr et al. | |
| 2017/0064587 A1* | 3/2017 | Xu | H04W 36/0055 |
| 2017/0208494 A1 | 7/2017 | Moon et al. | |
| 2017/0215117 A1* | 7/2017 | Kwon | H04B 7/04 |
| 2017/0230869 A1 | 8/2017 | Kubota et al. | |
| 2017/0332283 A1 | 11/2017 | Kubota et al. | |
| 2017/0374637 A1 | 12/2017 | Akkarakaran et al. | |
| 2018/0115958 A1* | 4/2018 | Raghavan | H04B 7/0478 |
| 2018/0242285 A1 | 8/2018 | Yoo et al. | |
| 2018/0317145 A1 | 11/2018 | Melin et al. | |
| 2018/0332520 A1* | 11/2018 | Cheng | H04W 36/0058 |
| 2019/0166527 A1* | 5/2019 | Oketani | H04B 7/0695 |

FOREIGN PATENT DOCUMENTS

| | | |
|---|---|---|
| WO | 2018083649 | 5/2018 |
| WO | 2019240985 | 12/2019 |

OTHER PUBLICATIONS

"First Action Interview Office Action", U.S. Appl. No. 16/056,947, dated Dec. 17, 2018, 6 pages.
"Pre-Interview Communication", U.S. Appl. No. 16/056,947, dated Oct. 18, 2018, 6 pages.
"Inter-Cell Handover in NR", 3GPP TSG-RAN WG2 Meeting #96, Reno, Nevada, USA, Nov. 14-18, 2016, Nov. 2016, 7 pages.
"International Search Report and Written Opinion", PCT Application No. PCT/US2019/035334, dated Nov. 21, 2019, 33 pages.

\* cited by examiner

HANDOVER OF A WIRELESS CONNECTION BASED ON UPLINK AND DOWNLINK SIGNAL QUALITIES

BACKGROUND

Communicating wirelessly requires that a user device maintains a connection to a wireless network that wirelessly links the user device to a base station in the wireless network. Maintaining quality of a wireless link to the base station is desirable from multiple perspectives, including that of the user device (e.g., effectiveness of communications), as well as that of that of the base station (e.g., efficient use of wireless network resources available to the base station).

The quality of the wireless link between the user device and the base station encompasses at least one quality of signals associated with downlink communications (e.g., communications received by the user device from the base station) as well as at least one quality of signals associated with uplink communications (e.g., communications transmitted from the user device to the base station). An example of a signal quality is signal strength, one measure of which is a received signal strength indicator (RSSI). For example, as part of communicating with the base station, the user device may receive strong downlink signals (e.g., downlink signals with strong RSSIs) while the base station concurrently receives weak uplink signals (e.g., uplink signals with weak RSSIs). In this example, even though the downlink signals are strong, the weak uplink signals compromise the wireless link as a whole. The user device may be able to receive data from the base station, but the base station may not be able to receive data from the user device. In an instance where the base station is not able to receive the data from the user device, resources of the wireless network, as allocated to communications between the base station and the user device, may go unused. As such, the use of resources available to the base station is inefficient and the user device is ineffective in transmitting data across the wireless network.

Maintaining a connection to the wireless network (via the user device wirelessly linking to the base station) presents challenges in certain instances, such as when the user device changes its physical location or when there is an increase in other user devices proximate to the base station that increases interference. In these and other instances, it may be beneficial for a handover to occur, during which the user device wirelessly links to a neighboring base station that also supports the wireless network. Today, it is common for a user device to determine that a handover needs to occur based on a quality of a downlink signal associated with downlink communications. However, as highlighted above, determining a handover based the quality of a downlink signal, without accounting for the quality of an uplink signal, may compromise efficient and effective use of resources in the wireless network as a whole.

SUMMARY

The present disclosure describes techniques and systems for handing over a connection of a user device, within a wireless network, based on qualities of downlink signals and qualities of uplink signals. These techniques and systems include a base station and a neighboring base station negotiating handover parameters, based on the qualities of downlink signals as detected by a user device and the qualities of uplink signals as detected by the base station and the neighboring base station. The base station and neighboring base station negotiate the handover parameters via an interface connecting the base station to the neighboring base station.

In some aspects, a method for handing over a connection to a user device in a wireless network is described. A first base station, through which the user device is connected to the wireless network, receives a downlink-quality report associated with one or more downlink signals transmitted from the first base station to the user device. After determining an uplink-quality report based on evaluation of one or more uplink signals received from the user device, the first base station negotiates handover parameters with a second base station where the negotiating is based, at least in part, on the received downlink-quality report and the determined uplink-quality report. The first base station then transmits, to the user device, a handover command that causes the user device to connect to the wireless network via the second base station in accordance with the negotiated handover parameters.

In some other aspects, a user device is described. The user device comprises a transceiver, a processor, and computer-readable storage media comprising instructions to implement a handover manager application. The handover manager application causes the user device to transmit, via the transceiver, a first uplink signal to a first base station through which the user device connects to a wireless network. The handover manager application causes the user device to then transmit, via the transceiver, a second uplink signal to a second base station, where the transmitting of the first uplink signal and the second uplink signal being is effective to cause the first base station and the second base station to negotiate handover parameters for the user device based, at least in part, on the transmitted first and second uplink signals. The handover manager application then causes the user device to receive, from the first base station and via the transceiver, a handover command, where the handover command causes the user device to connect to the wireless network through the second base station in accordance with the handover parameters negotiated by the first base station and the second base station.

In further aspects, a first base station is described. The first base station comprises a transceiver, an interface to a second base station, a processor, and computer-readable storage media comprising instructions to implement a handover manager application. The handover manager application causes the first base station to measure, using the transceiver, a signal strength of an uplink received from a user device that is connected to a wireless network through the first base station and generate an uplink-quality report, where generating the uplink-quality report is based on evaluating the signal strength of the received uplink signal from the user device. The handover manager application then causes the first base station to negotiate handover parameters with the second base station via the interface, where the negotiation is based, at least in part, on the generated uplink-quality report and where the handover parameters include resources of the wireless network that the user device is to use when connecting to the wireless network through the second base station. The first base station is then caused by the handover manager application to transmit, to the user device via the transceiver, a handover command, the transmission of the handover command causing the user device to connect to the wireless network through the second base station in accordance with the negotiated handover parameters.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of determining and initiating a handover of a wireless connection based on uplink and downlink signal qualities. The use of the same reference numbers in different instances in the description and the figures may indicate like elements.

DETAILED DESCRIPTION

Connecting a user device to a wireless network, such as a Long Term Evolution (LTE) network or a Fifth-Generation New Radio (5G NR) network, utilizes an air interface that connects the user device via a wireless link to a base station that supports communications within the wireless network. As part of establishing and maintaining the wireless link (and the connection of the user device to the wireless network), the base station and the user device may communicate one or more signals that transport data including, for example, a Downlink Control Information (DCI) signal, a Radio Resource Control (RRC) signal, a Channel State Information-Resource Information (CSI-RS) signal, a Synchronization Signal Block (SSB) signal, a Sounding Reference Signal (SRS), or the like.

In certain instances, the base station may monitor qualities of the one or more signals, (i) by directly measuring and evaluating received uplink signal qualities to determine an uplink-signal quality report or (ii) by receiving downlink signal qualities via a downlink-signal quality report that is determined by the user device. The signal qualities (either the uplink signal qualities or the downlink signal qualities) may be data that is a Received Signal Strength Indicator (RSSI) metric, a Signal-to-Noise Ratio (SNR) metric, a distortion metric, a consistency metric, an intermittency metric, or the like. Variables such as beamforming (performed by either the base station or the user device), transmission power (available to either the base station or the user device), a relative distance between the base station and the user device, or destructive signal interferences (due to network congestion within the air interface) may impact either, or both, of the downlink signal qualities and the uplink signal qualities.

Using the downlink and uplink signal quality reports, the base station and a neighboring base station (also supporting communications of the wireless network) can negotiate handover parameters that ensure the user device stays connected to the wireless network. The negotiated handover parameters may include, for example, a time to initiate a handover, resources of the air interface to be used during the handover (e.g., resource blocks including resource elements) of the wireless connection, beamforming parameters to be used by the user device during the handover of the wireless connection, or the like. The negotiations between the base station and the neighboring base station may occur via a network interface that connects the base station and the neighboring base station, such as an Xn interface. The Xn interface, in general, is a network interface which connects nodes supporting a Radio Access Network (RAN), and can connect a gNB base station to a gNB base station, a gNB base station to an eNB base station, or the like. After negotiating the handover parameters with the neighboring base station, the base station may then send, to the user device, a handover command that includes the negotiated handover parameters.

While features and concepts of the described systems and methods for a handover of a wireless link based on uplink and downlink signal qualities can be implemented in any number of different environments, systems, devices, and/or various configurations, aspects of the handover are described in the context of the following example devices, systems, and configurations.

Operating Environment

Figure 1:
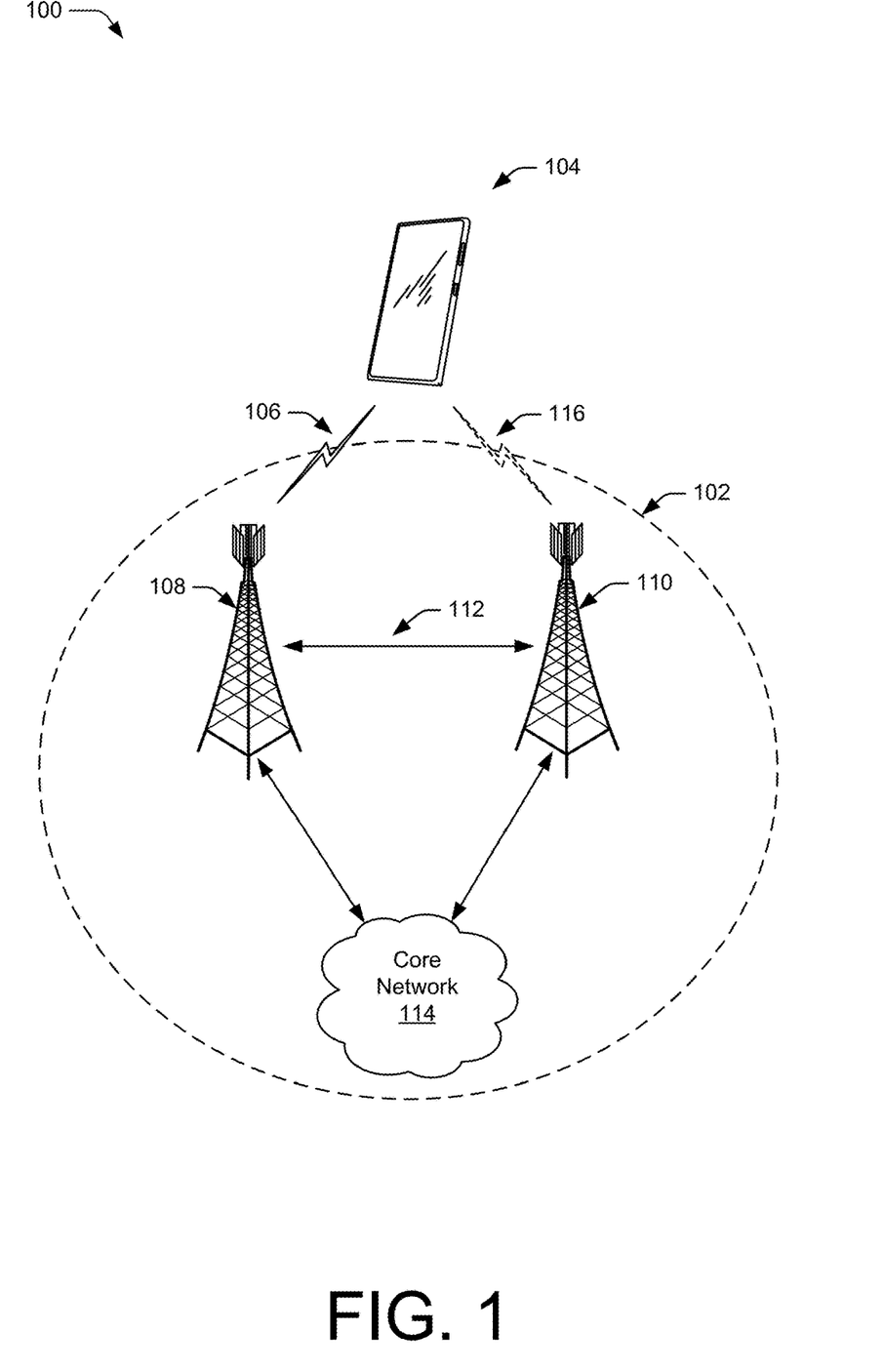
FIG. 1 illustrates an example operating environment in which various aspects of handover of a wireless connection based on uplink and downlink qualities can be implemented.

FIG. 1 illustrates an example operating environment 100 in which techniques of handover of a wireless connection based on uplink and downlink qualities can be implemented. The operating environment 100 includes a wireless network 102 to which a user device 104 (illustrated as a smartphone) connects via wireless link 106 connecting the user device to a serving base station 108. In this example, the user device 104 is implemented as a smartphone. Although illustrated as a smartphone, the user device 104 be implemented as any suitable computing or electronic device, such as a mobile communication device, a user equipment (UE), a modem, cellular phone, gaming device, navigation device, media device, laptop computer, desktop computer, tablet computer, smart appliance, vehicle-based communication system, and the like. The serving base station 108 (e.g., an Evolved Universal Terrestrial Radio Access Network Node B, E-UTRAN Node B, evolved Node B, eNodeB, eNB, Next Generation Node B, gNode B, gNB, and the like) may be implemented in a macrocell, microcell, small cell, picocell, and the like, or any combination thereof.

The serving base station 108 communicates with the user device 104 via the wireless link 106 which supports downlink communications from the serving base station 108 to the user device 104 and uplink communications from the user device 104 to the serving base station 108. The wireless link 106 can include a downlink of data and control information communicated from the serving base station 108 to the user device 102 and/or an uplink of other data and control information communicated from the user device 104 to the serving base station 108. The wireless link 106 may include one or more wireless links or bearers implemented using any suitable communication protocol or standard, or combination of communication protocols or standards such as 3rd Generation Partnership Project Long-Term Evolution (3GPP LTE), 5G NR, and so forth. The serving base station 108 can communicate with a neighbor base station 110 using an interface 112 (such as Xn interface), to exchange user-plane and control-plane data.

The user device 104 may connect to a core network 114 (e.g., a public network provided by a network service provider) through the serving base station 108 via the wireless link 106. The core network 114 may include, for example, routers, servers, other base stations, or communication hardware that enable the user device 104 to communicate and exchange data with other user devices.

In certain instances, a handover may occur, during which the user device 104 connects to the core network 114 through the neighbor base station 110 via another wireless link 116. Such instances may occur when downlink and uplink signal qualities between the neighbor base station 110 and the user device 104 are favorable to downlink and uplink signal qualities between the serving base station 108 and the user device 104. In such instances, the serving base station 108 and the neighbor base station 110 may communicate directly, via the interface 112, to negotiate handover parameters.

Figure 2:
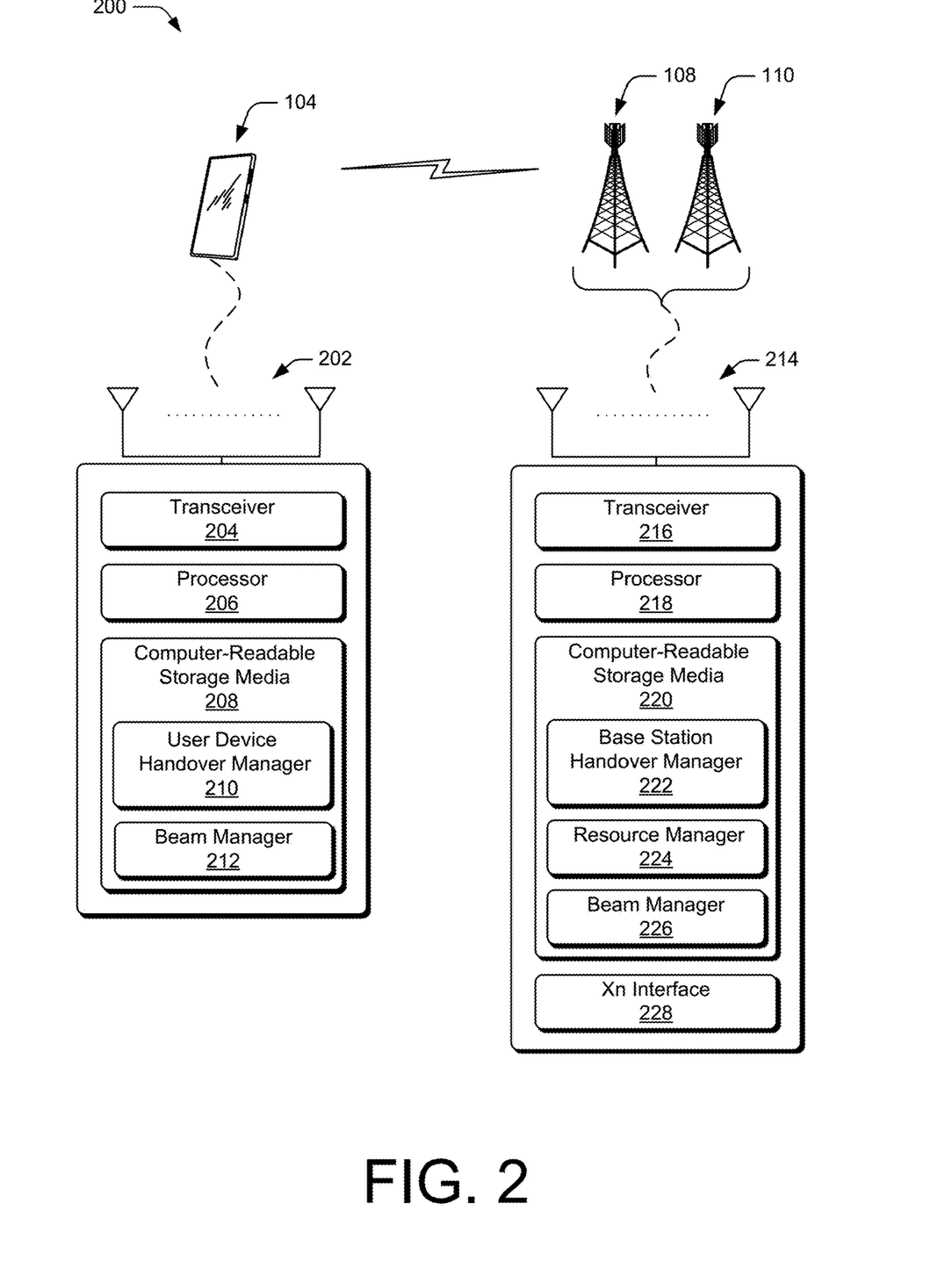
FIG. 2 illustrates example user device and base station diagrams that can implement various aspects of handover of a wireless connection based on uplink and downlink qualities.

FIG. 2 illustrates an example device diagram 200 of the user device 104, the serving base station 108, and the neighbor base station 110 of FIG. 1, that can implement various aspects of handover of a wireless connection based on uplink and downlink qualities. It should be noted that only the essential features of the user device 104, the serving base station 108, and the neighbor base station 110 are illustrated here for the sake of clarity.

The user device 104 includes a Multiple Input Multiple Output (MIMO) antenna array 202 and a transceiver 204. The transceiver 204 may be, for example, an LTE transceiver or a 5G NR transceiver. The MIMO antenna array 202 can be tuned to, and/or be tunable to, one or more frequency bands defined by the 3GPP LTE and 5G NR communication standards and implemented by the transceiver 204. Furthermore, the MIMO antenna array 202 can be configured to form transmission beams (e.g., directionally form beams for transmitting uplink communications) originating from the user device 104.

The user device 104 also includes a processor 206 and computer-readable storage media 208 (CRM 208). The processor 206 may be a single core processor or a multiple core processor composed of a variety of materials, such as silicon, polysilicon, high-K dielectric, copper, and so on. The computer-readable storage media described herein excludes propagating signals. CRM 208 may include any suitable memory or storage device such as random-access memory (RAM), static RAM (SRAM), dynamic RAM (DRAM), non-volatile RAM (NVRAM), read-only memory (ROM), or Flash memory useful to store device data of the user device 104. The CRM 208 includes code or instructions for a user-device handover manager 210, which, when executed by the processor 206, causes the user device 104 to perform functions that support a handover of a wireless connection. The CRM 208 also includes code or instructions for a beam manager 212 which, when executed by the processor 206, can cause the user device 104 to perform a beam-sweeping operation or directionally form a beam as part of uplink communications. Alternately or additionally, user-device handover manager 210 or the beam manager 212 may be implemented in whole or part as hardware logic or circuitry integrated with or separate from other components of the user device 104.

The device diagram for the serving base station 108 and the neighbor base station 110 shown in FIG. 2 includes a single network node (e.g., an E-UTRAN Node B or gNode B). The functionality of the serving base station 108 and/or the neighbor base station 110 may be distributed across multiple network nodes and/or devices, may be and distributed in any fashion suitable to perform the functions described herein. The serving base station 108 and the neighbor base station 110 each include a Multiple Input Multiple Output (MIMO) antenna array 214 and a transceiver 216 for communicating with the user device 104. The MIMO antenna array 214 of the serving base station 108 and the neighbor base station 110 may include multiple antennas that are configured similar to or differently from each other. The MIMO antenna array 214 can be tuned to, and/or be tunable to, one or more frequency bands defined by the 3GPP LTE and 5G NR communication standards and implemented by the transceiver 216. Furthermore, the transceiver 216 and the MIMO antenna array 214 can be configured to form transmission beams (e.g., use principles of constructive and destructive signal interference to directionally form beams transmitting downlink communications) originating from the serving base station 108 and the neighbor base station 110.

The serving base station 108 and the neighbor base station 110 include a processor 218 and computer-readable storage media 220 (CRM 220). The processor 218 may be a single core processor or a multiple core processor composed of a variety of materials, such as silicon, polysilicon, high-K dielectric, copper, and so on. The computer-readable storage media described herein excludes propagating signals. CRM 220 may include any suitable memory or storage device such as random-access memory (RAM), static RAM (SRAM), dynamic RAM (DRAM), non-volatile RAM (NVRAM), read-only memory (ROM), or Flash memory useful to store device data of the user device 104.

The CRM 220 includes code or instructions for a base-station handover manager 222, which, when executed by the processor, cause the base station (e.g., the serving base station 108 or the neighbor base station 110) to perform functions that support a handover of a wireless connection. The CRM 220 further includes code or instructions for a resource manager 224, which can allocate resource units (e.g., resource blocks including resource elements) for communications with the user device 104, as well code or instructions for a beam manager 226, which when executed by the processor 206, can cause the user device 104 to perform a beam-sweeping operation or directionally form a beam as part of downlink communications. Alternately or additionally, the base-station handover manager 222, the resource manager 224, or the beam manager 226 may be implemented in whole or part as hardware logic or circuitry integrated with or separate from other components of the serving base station 108 or the neighbor base station 110.

The serving base station 108 and the neighbor base station 110 further include hardware in the form of an Xn interface 228. The Xn interface 228, in general, is hardware supporting communications between the serving base station 108 and the neighbor base station 110 via the interface 112 of FIG. 1.

Signal Quality and Handing Over a Wireless Connection

Figure 3:
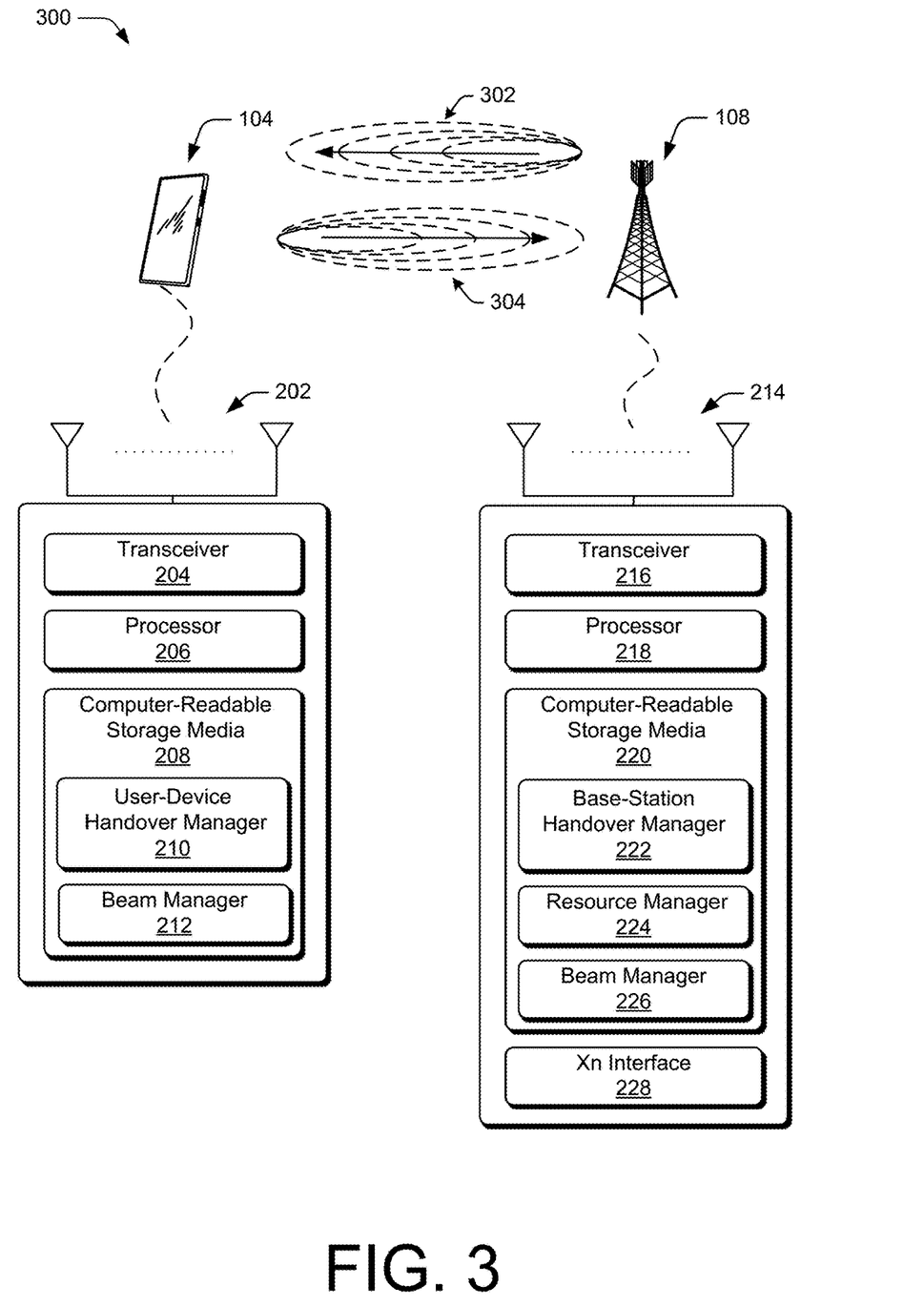
FIG. 3 illustrates details of an example user device and an example base station exchanging downlink and uplink signals in accordance with aspects of a handover of a wireless connection based on uplink and downlink qualities.

FIG. 3 illustrates details 300 of an example user device and an example base station exchanging downlink and uplink signals in accordance with aspects of a handover of a wireless connection based on uplink and downlink qualities. The user device may be the user device 104 of FIG. 1 and the base station may be the serving base station 108 of FIG. 1.

As illustrated in FIG. 3, the serving base station 108 is transmitting a downlink signal 302 in the form of a beam. The downlink signal 302 may be, for example, a Downlink Control Information (DCI) signal, a Radio Resource Control (RRC) signal, a Channel State Information-Resource Information (CSI-RS) signal, or a Synchronization Signal Block (SSB) signal. The user device 104 may, through the processor 206 executing the code or instructions of the user-device handover manager 210, measure qualities of the downlink signal via sensing circuitry embedded in the transceiver 204 and determine a downlink-quality report. The downlink-quality report may include data such as a Received Signal Strength Indicator (RSSI) metric, a Signal-to-Noise Ratio (SNR) metric, a distortion metric, a consistency metric, an intermittency metric, or the like.

Also as illustrated in FIG. 3, the user device 104 is transmitting an uplink signal 304 in the form of another beam. The uplink signal 304 may be, for example, a Sounding Reference Signal (SRS). The serving base station 108 may, through the processor 218 executing the code or instructions of the base-station handover manager 222, measure qualities of the uplink signal 304 via sensing circuitry embedded in the transceiver 216 and determine an uplink-quality report. The uplink-quality report may include data such as a Received Signal Strength Indicator (RSSI) metric, a Signal-to-Noise Ratio (SNR) metric, a distortion metric, a consistency metric, an intermittency metric, or the like.

Figure 4:
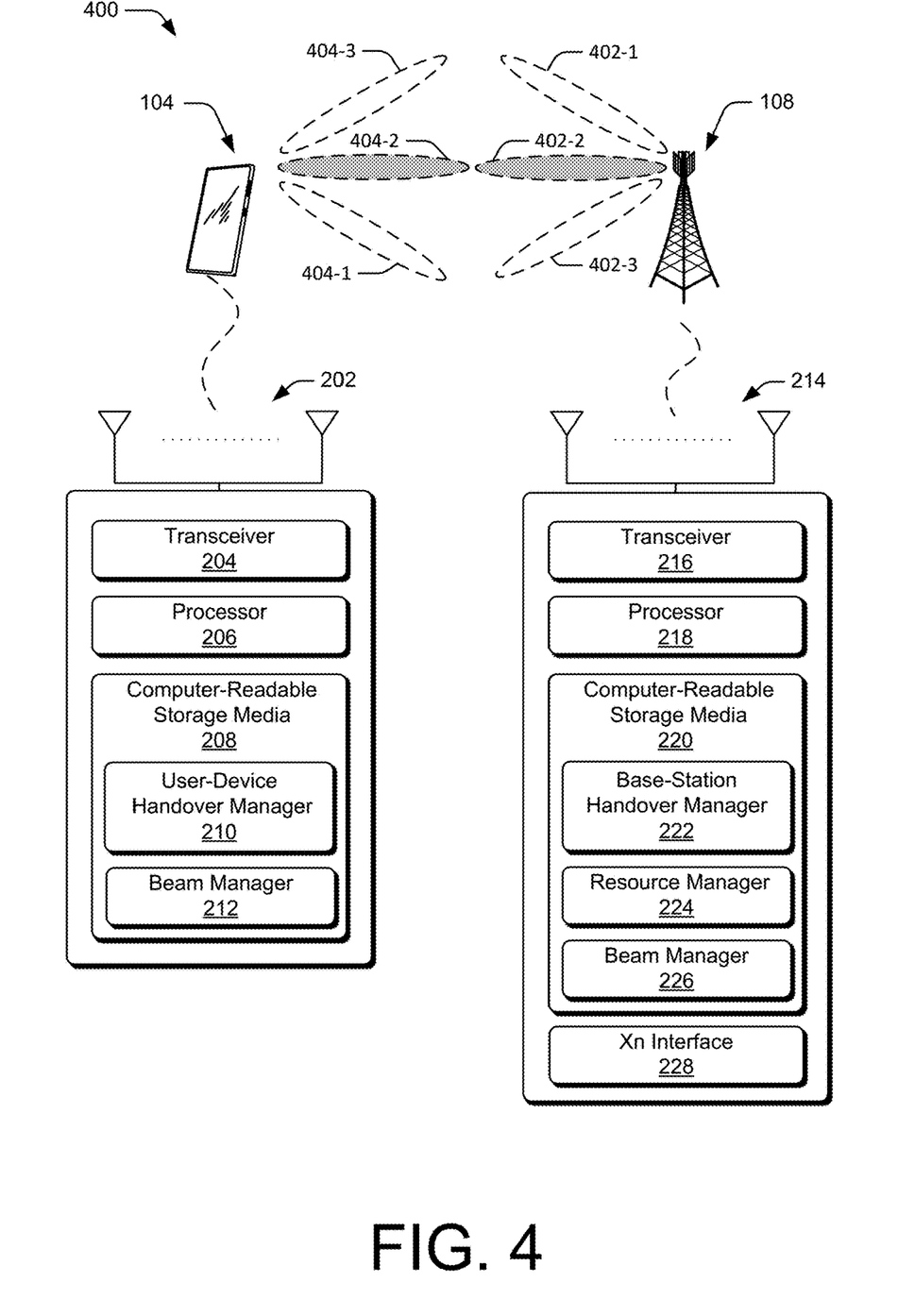
FIG. 4 illustrates an example details of beamforming and beam sweeping in accordance with aspects of handover of a wireless connection based on uplink and downlink qualities.

FIG. 4 illustrates an example details 400 of beamforming and beam sweeping in accordance with aspects of handover of a wireless connection based on uplink and downlink qualities. The user device diagram may be of the user device 104 of FIG. 1 and the base station diagram may be of the serving base station 108 and the neighbor base station 110 of FIG. 1. It should be noted that only the essential features of the user device 104, the serving base station 108, and the neighbor base station 110 are illustrated here for clarity.

As illustrated in FIG. 4, the serving base station 108 is performing a beam-sweeping operation. In this instance, the processor 218 executes code of the beam manager 226 to invoke, sequentially, a plurality of configurations of the transceiver 216 and the MIMO antenna array 214. Each configuration, through constructive and destructive signal interference principles, directionally forms a respective downlink beam (e.g., downlink beams 402-1 through 402-3) that carries a corresponding downlink signal. Each corresponding downlink signal may contain configuration data indicating the respective configuration of the transceiver 216 and MIMO antenna array 214. Furthermore, each respective downlink beam may be transmitted over a random access channel (RACH) associated with the wireless network 102.

For each of the respective downlink beams 402-1 through 402-3, the user device 104 may, through the processor 206 executing the code or instructions of the user-device handover manager 210, measure qualities of the carried downlink signal via sensing circuitry embedded in the transceiver 204 to determine a downlink-quality report. In addition to the downlink-quality report including data such as a Received Signal Strength Indicator (RSSI) metric, a Signal-to-Noise Ratio (SNR) metric, a distortion metric, a consistency metric, an intermittency metric, or the like, the downlink-quality report may include the configuration data indicating the respective configuration of the transceiver 216 and the MIMO antenna array 214 for each of the downlink beams 402-1 through 402-3. In this particular example, and as illustrated, downlink beam 402-2 possess the most favorable qualities for downlink communications from the serving base station 108 to the user device 104.

Also as illustrated in FIG. 4, the user device 104 is performing a beam-sweeping operation. In this instance, the processor 206 executes code of the beam manager 212 to invoke, sequentially, a plurality of configurations of the transceiver 204 and the MIMO antenna array 202. Each configuration, through constructive and destructive signal interference principles, directionally forms a respective uplink beam (e.g., uplink beams 404-1 through 404-3) that carries a corresponding uplink signal. Each corresponding uplink signal may contain configuration data indicating the respective configuration of the transceiver 204 and MIMO antenna array 202 for each of the respective uplink beams 404-1 through 404-3. Furthermore, each respective uplink beam may be transmitted over a random access channel (RACH) associated with the wireless network 102.

For each of the respective uplink beams 404-1 through 404-3, the base station 108 may, through the processor 218 executing the code or instructions of the base station handover manager 222, measure qualities of the carried uplink signal via sensing circuitry embedded in the transceiver 216 and determine an uplink-quality report. In addition to the uplink-quality report including data such as a Received Signal Strength Indicator (RSSI) metric, a Signal-to-Noise Ratio (SNR) metric, a distortion metric, a consistency metric, an intermittency metric, or the like, the uplink-quality report may include the configuration data indicating the respective configuration of the transceiver 204 and the MIMO antenna array 202 for each of the uplink beams 404-1 through 404-3. In this particular example, and as illustrated, beam 404-2 possess the most favorable qualities for uplink communications from the user device 104 to the serving base station 108.

Figure 5:
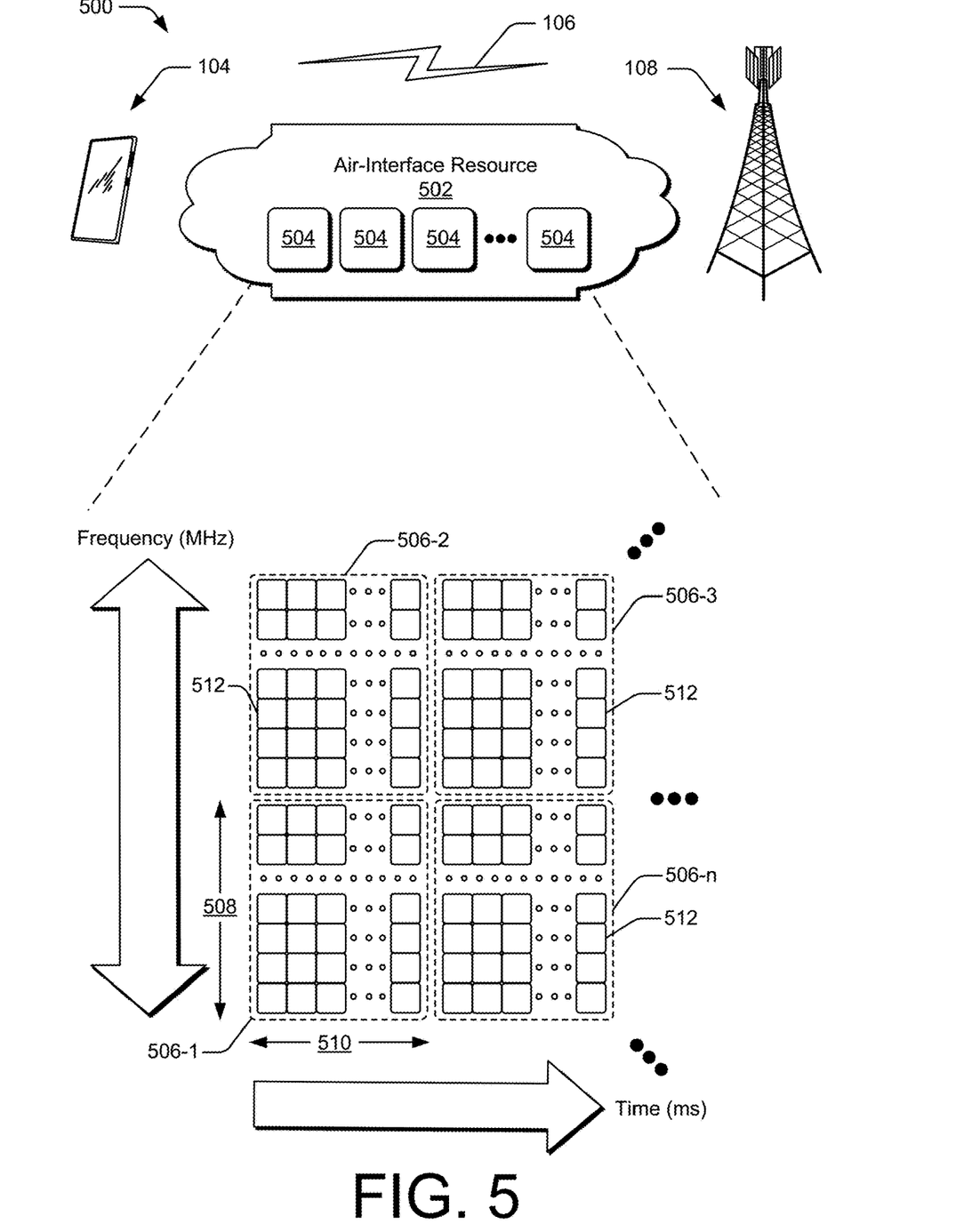
FIG. 5 illustrates example details of wireless network resources useable by the described techniques of FIGS. 1-4.

FIG. 5 illustrates example details 500 of wireless network resources useable by the described techniques of FIGS. 1-4. As illustrated, the wireless network resources are in the form of an air-interface resource 502 supporting the wireless link 106 that extends between the user device 104 and the serving base station 108 of FIG. 1. The air-interface resource 502 may, in general, be associated to the wireless network 102.

The air-interface resource 502 can divided into resource units 504, each of which occupies some intersection of frequency spectrum and elapsed time. A portion of the air-interface resource 502 is illustrated graphically in a grid or matrix having multiple resource blocks 506, including resource blocks 506-1, 506-2, 506-3 . . . 506-n, with "n" representing some positive integer. An example of a resource unit 504 therefore includes at least one resource block 506. As shown, time is depicted along the horizontal dimension as the abscissa axis, and frequency is depicted along the vertical dimension as the ordinate axis. The air-interface resource 502, as defined by a given communication protocol or standard, may span any suitable specified frequency range and/or may be divided into intervals of any specified duration. Increments of time can correspond to, for example, milliseconds (ms). Increments of frequency can correspond to, for example, megahertz (MHz).

The serving base station 108 allocates portions (e.g., resource units 504) of the air-interface resource 502 for uplink and downlink communications associated with the wireless link 106. Each resource block 506 of network access resources may be allocated to support respective wireless communications of multiple end-user devices. In the lower left corner of the grid, the resource block 506-1 may span, as defined by a given communication protocol, a specified frequency range 508 and comprise multiple sub-carriers. The resource block 506-1 may include any suitable number of subcarriers (e.g., 12) that each correspond to a respective portion (e.g., 15 kHz) of the specified frequency range 508 (e.g., 180 kHz). The resource block 506-1 may also span, as defined by the given communication protocol, a specified time interval 510 or time slot (e.g., lasting approximately one-half millisecond or 7 orthogonal frequency-division multiplexing (OFDM) symbols). The specified time interval 510 includes subintervals that may each correspond to a symbol, such as an OFDM symbol. As shown in FIG. 5, each resource block 506 may include multiple resource elements 512 (REs) that correspond to, or are defined by, a subcarrier of the specified frequency range 508 and a subinterval (or symbol) of the specified time interval 510. Alternatively, a given resource element 512 may span more than one frequency subcarrier or symbol. Thus, a resource unit 504 may include at least one resource block 506, at least one resource element 512, and so forth.

The resource manager of the serving base station 108 (e.g., the resource manager 224 of FIG. 2) may determine a respective type or amount of information (e.g., data or control information) to be communicated (e.g., transmitted) by the user device 104. For example, the resource manager 224 can determine that user device 104 is to transmit a different respective amount of information. The resource manager 224 then allocates one or more resource blocks 506 to the user device 104 based on the determined amount of information. Additionally or in the alternative to block-level resource grants, the resource manager 224 may allocate resource units at an element-level. Thus, the resource manager may allocate one or more resource elements 512 or individual subcarriers to the user device 104. By so doing, one resource block 506 can be allocated to facilitate network access for the user device 104. The resource manager 224 can therefore allocate air-interface resource 502 by resource block 506, frequency carrier, time interval, resource element 512, frequency subcarrier, time subinterval, symbol, spreading code, some combination thereof, and so forth.

The described techniques of FIG. 3, FIG. 4, and FIG. 5, in whole or in part, are replicable between the user device 104 and the neighboring base station 110 of FIG. 1. In the event one or more qualities of downlink and uplink signals between the user device 104 and the serving base station 108 degrades below an acceptable threshold, or in the event the one or more qualities are projected to improve if a new wireless link is established between the user device 104 and the neighboring base station 110, a handover may be initiated.

Figure 6:
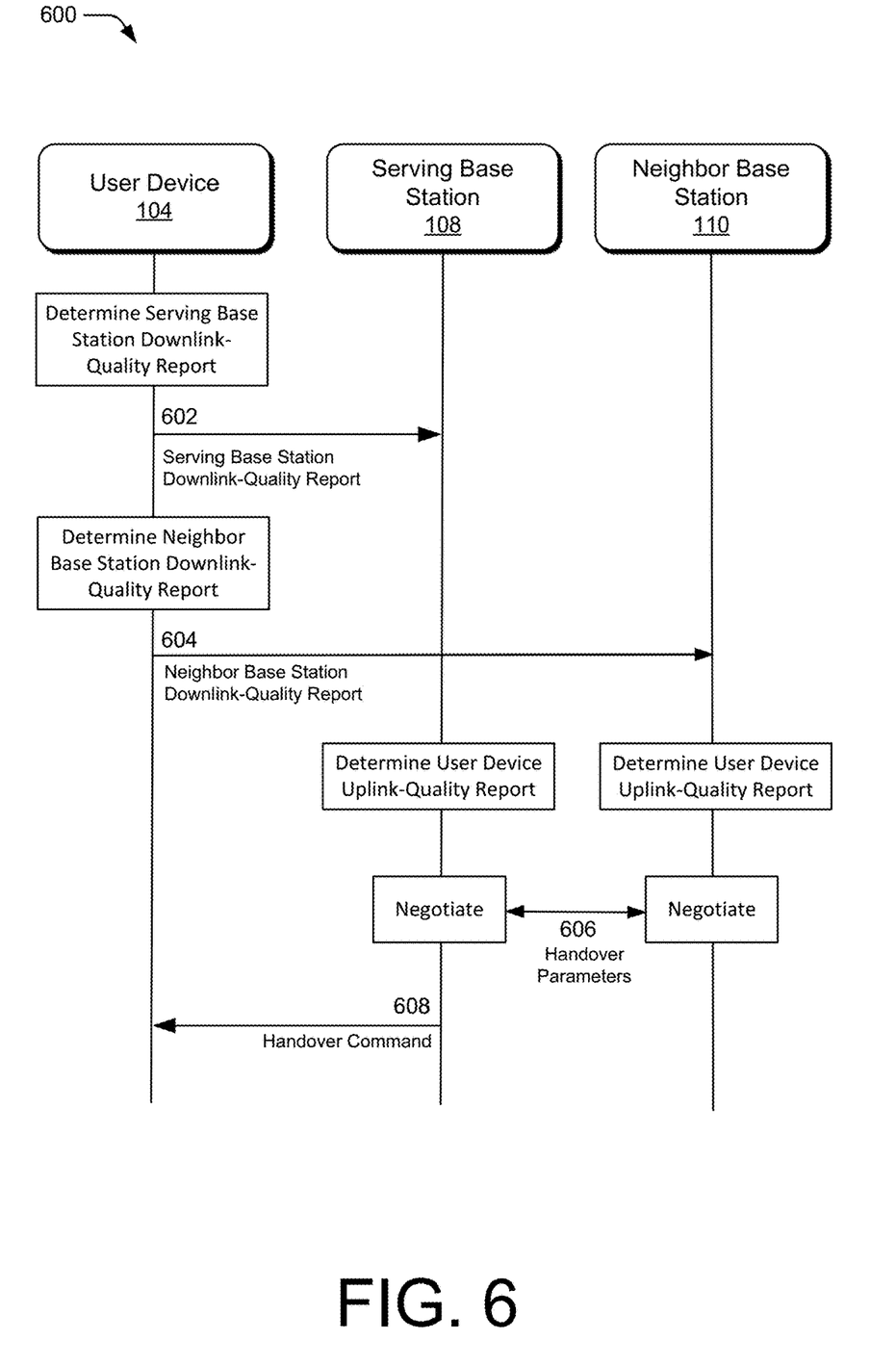
FIG. 6 illustrates example details of data and control transactions between devices in accordance with aspects of handover of a wireless connection based on uplink and downlink qualities.

FIG. 6 illustrates example details 600 of data and control transactions between devices in accordance with aspects of handover of a wireless connection based on uplink and downlink qualities. The data and control transactions may occur via the user device 104 communicating directly with the serving base station 108 and the neighbor base station 110 as well as the serving base station 108 communicating with the neighbor base station 110.

In response to receiving one or more downlink signals from the serving base station 108 and the neighbor base station 110, the user device 104 may determine respective downlink-quality reports. Each downlink-quality report may include respective data as described above with respect to FIG. 3 and FIG. 4, including any combination of data derived from a Received Signal Strength Indicator (RSSI) metric, a Signal-to-Noise Ratio (SNR) metric, a distortion metric, a consistency metric, an intermittency metric, and a transceiver and MIMO antenna beamforming configuration. The user device 104 may then transmit the determined, respective downlink-quality reports to the respective base stations (e.g., transmit the serving base station downlink-quality report, at 602, to the serving base station 108 and the neighbor base station downlink-quality report, at 604, to the neighbor base station 110).

The serving base station 108 and the neighbor base station 110 may then each determine a respective user device uplink-quality report based on one or more received respective, uplink signals received from the user device 104. Each respective uplink-quality report may include data as described above in FIG. 3 and FIG. 4, including any combination of data derived from a Received Signal Strength Indicator (RSSI) metric, a Signal-to-Noise Ratio (SNR) metric, a distortion metric, a consistency metric, an intermittency metric, and a transceiver and MIMO antenna beamforming configuration as associated with the one or more respective, received uplink signals.

The serving base station 108 and the neighbor base station 110 may then negotiate handover parameters 606. The negotiation may occur via an interface such as the interface 112 of FIG. 1 which in some instances may be an Xn interface. The negotiation may be based, at least in part, on the respective uplink-quality and downlink-quality reports, and include exchanging the respective uplink-quality and downlink-quality reports, weighting portions of the respective uplink-quality and downlink-quality reports, evaluating histories of associated, respective uplink-quality and downlink-quality reports, or the like. The negotiation may also include determining and allocating resources of the air-interface resource 502 (e.g., the resource units 504 FIG. 5) for use during a handover of a wireless connection, determining a beamforming configuration to be used by the user device 104 and the neighbor base station 110 during the handover of the wireless connection, a time for the handover of the wireless connection to be initiated, or the like.

Based on the negotiated handover parameters 606, the serving base station 108 may transmit, to the user device, a handover command 608. The handover command 608 may include the negotiated handover parameters 606, including the determined and allocated resources of the air-interface resource 502 to be used during the handover of the wireless connection, data for configuring the transceiver 204 and the MIMO antenna array 202 of the user device 104 to form beams during the handover of the wireless connection, a time at which to initiate the handover of the wireless connection, or the like.

Example methods 700 and 800 are described with reference to FIGS. 7 and 8 in accordance with one or more aspects of aspects of handover of a wireless connection based on uplink and downlink qualities. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (AS SPs), System-on-a-chip systems (SoCs), Complex Programmable Logic Devices (CPLDs), and the like.

Figure 7:
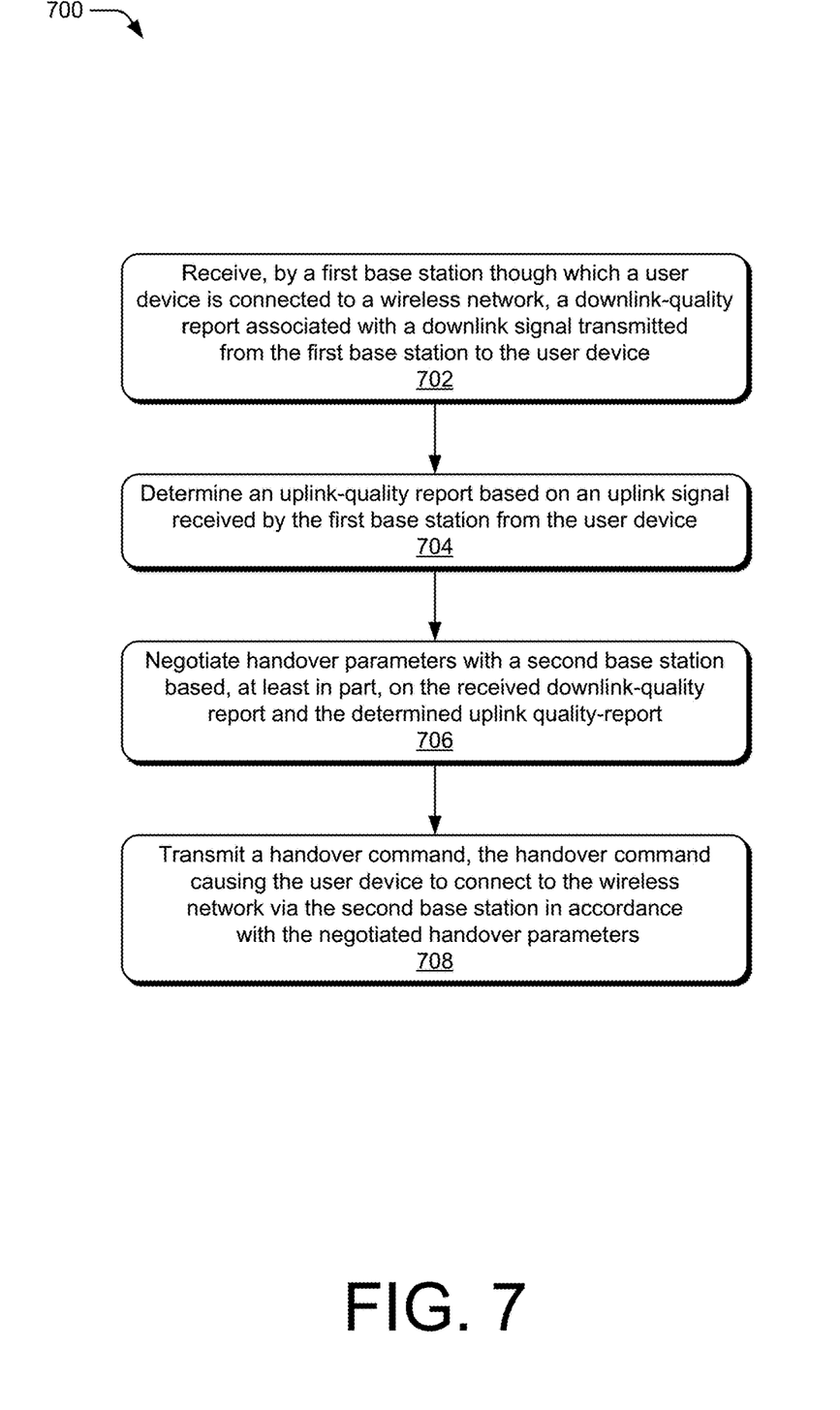
FIG. 7 illustrates an example method of handover of a wireless connection based on uplink and downlink qualities as generally related to a base station.

FIG. 7 illustrates an example method 700 of handover of a wireless connection based on uplink and downlink qualities as generally related to a base station. The method 700 is described in the form of a set of blocks 702-708 that specify operations that can be performed. However, operations are not necessarily limited to the order shown in FIG. 7 or described herein, for the operations may be implemented in alternative orders or in fully or partially overlapping manners. Operations represented by the method 700 may be performed by the serving base station 108 of FIG. 1, and performed using elements of FIGS. 2-6.

At 702, a first base station (e.g., the serving base station 108) through which a user device (e.g., the user device 104) is connected to a wireless network (e.g., the wireless network 102), receives a downlink-quality report (e.g., the downlink-quality report 602) associated with a downlink signal transmitted (e.g., the downlink signal 302) from the first base station to the user device.

The downlink signal may be, for example, a Downlink Control Information (DCI) signal, a Radio Resource Control (RRC) signal, a Channel State Information-Resource Information (CSI-RS) signal, or a Synchronization Signal Block (SSB) signal. In certain instances, the downlink signal may include one or more downlink signals received via a plurality of downlink beams formed by the first base station as part of a beam-sweeping operation (e.g., the downlink beams 402-1 through 402-3). In such an instance, the downlink-quality report associates downlink signal qualities to each of the plurality of beams formed by the first base station. The downlink-quality report may include a Received Signal Strength Indicator (RSSI) metric, a Signal-to-Noise Ratio (SNR) metric, a distortion metric, a consistency metric, an intermittency metric, or a transceiver and MIMO antenna beamforming configuration.

At 704, the first base station determines an uplink-quality report. The uplink-quality report may be determined based on an uplink signal (e.g., the uplink signal 304) received by the first base station from the user device. In certain instances, the uplink signal may include one or more uplink signals received via a plurality of uplink beams formed by the user device as part of a beam-sweeping operation (e.g., the uplink beams 404-1 through 404-3). In such an instance, the uplink-quality report associates uplink signal qualities to each of the plurality of beams formed by the first base station. The uplink-quality report may include a Received Signal Strength Indicator (RSSI) metric, a Signal-to-Noise Ratio (SNR) metric, a distortion metric, a consistency metric, an intermittency metric, or a transceiver and MIMO antenna beamforming configuration.

At 706, the first base station may negotiate handover parameters (e.g., the handover parameters 606 of FIG. 6) with a second base station (e.g., the neighbor base station 110) where the negotiating is based, at least in part, on the received downlink-quality report and the determined uplink-quality report. The negotiating occurs via an interface (e.g., the interface 112) with the second base station which, where the interface may, in certain instances, be an Xn interface.

Continuing with 706, the negotiating may include exchanging, with the second base station, the received downlink-quality report and the determined uplink-quality report with respective downlink-quality and uplink-quality reports as received and determined by the second base station also communicating with the user device. The negotiating may also include weighting portions of the respective downlink-quality and uplink-quality reports or evaluating histories of the respective downlink-quality and uplink-quality reports.

At 708, the first base station transmits a handover command (e.g., the handover command 608 of FIG. 6) to the user device. The handover command may include negotiated handover parameters that include, for example, data representative of allocated resources of the air-interface resource 502 (e.g., the resource units 504 FIG. 5) for use during a handover of a wireless connection, a beamforming configuration to be used by a transceiver (e.g., the transceiver 204) and a MIMO antenna array (e.g., the MIMO antenna array 202) of the user device during the handover of the wireless connection, a time for the handover of the wireless connection to be initiated, or the like. The handover command then causes the user device to connect to the wireless network via the second base station in accordance with the negotiated handover parameters.

Figure 8:
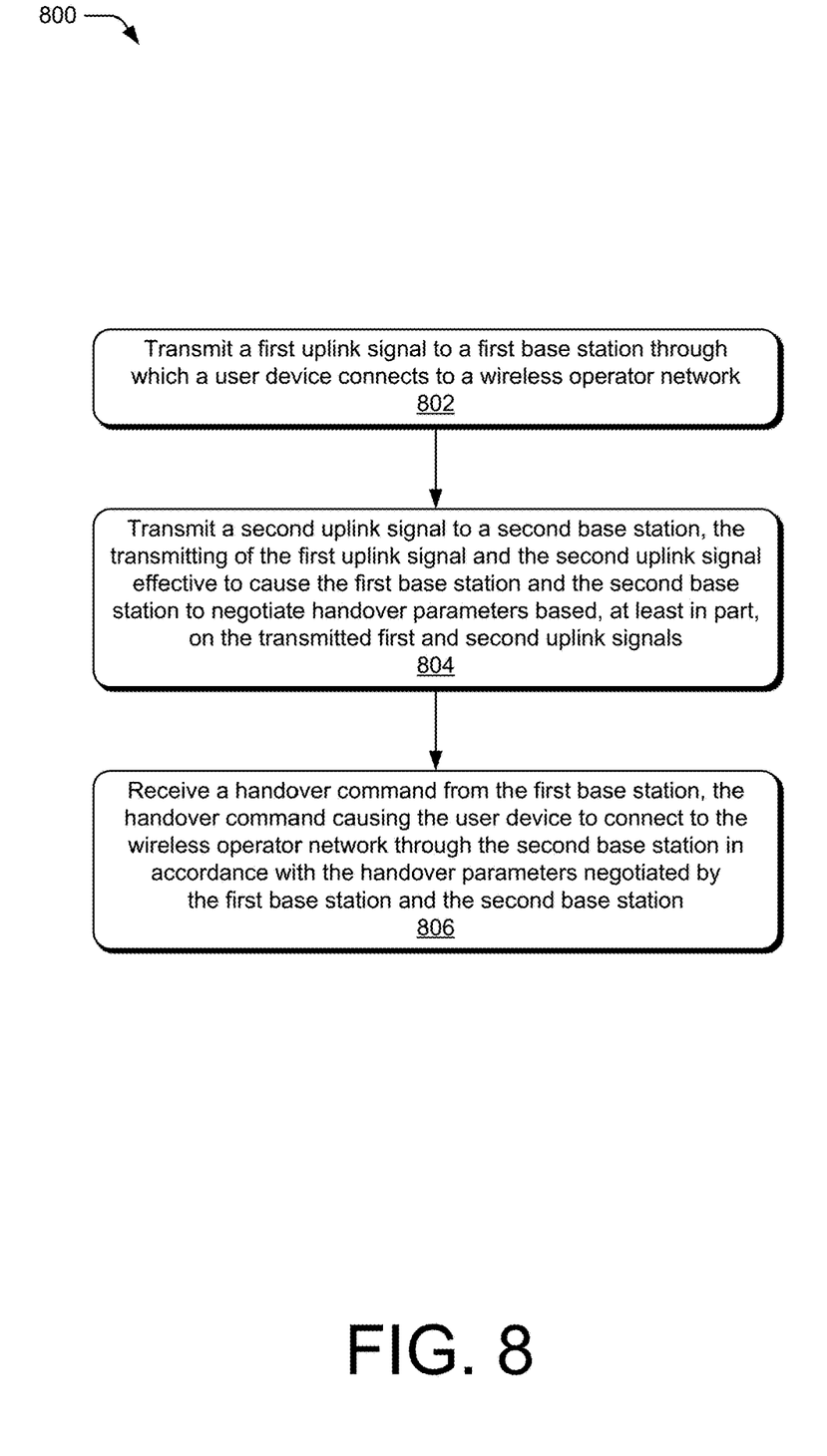
FIG. 8 illustrates an example method of handover of a wireless connection based on uplink and downlink qualities as generally related to a user device.

FIG. 8 illustrates an example method 800 of handover of a wireless connection based on uplink and downlink qualities as generally related to a user device. The method 800 is described in the form of a set of blocks 802-806 that specify operations that can be performed. However, operations are not necessarily limited to the order shown in FIG. 8 or described herein, for the operations may be implemented in alternative orders or in fully or partially overlapping manners. Operations represented by the method 800 may be performed by the user device 104 of FIG. 1, and performed using elements of FIGS. 2-6.

At 802, a user device (e.g., the user device 104) transmits a first uplink signal to a first base station (e.g., the serving base station 108) through which the user device is connected to a wireless network (e.g., the wireless network 102). The first uplink signal, in certain instances, may be a Sounding Reference Signal (SRS) and, in certain instances, may comprise multiple SRS uplink signals transmitted via a plurality of uplink beams formed by the user device (e.g., the uplink beams 404-1 through 404-3).

In certain instances, the user device may also determine and transmit a first downlink-quality report (e.g., the serving base station downlink-quality report 602) to the first base station, where the first downlink-quality report is determined based on one or more downlink signals received from the first base station. The received downlink signals may be comprised of any combination of a Downlink Control Information (DCI) signal, a Radio Resource Control (RRC) signal, a Channel State Information-Resource Information (CSI-RS) signal, or a Synchronization Signal Block (SSB) signal. Furthermore, in certain instances, the received downlink signals may be multiple downlink signals received via multiple downlink beams formed by the first base station (e.g., the downlink beams 402-1 through 402-3). As such, the first downlink-quality report may include a Received Signal Strength Indicator (RSSI) metric, a Signal-to-Noise Ratio (SNR) metric, a distortion metric, a consistency metric, an intermittency metric, or a transceiver and MIMO antenna beamforming configuration.

At 804, a user device transmits a second uplink signal to a second base station (e.g., the neighbor base station 110) through which the user device is connected to a wireless network. The second uplink signal, in certain instances, may be a Sounding Reference Signal (SRS) and, in certain instances, may comprise multiple uplink signals transmitted via multiple uplink beams formed by the user device (e.g., the uplink beams 404-1 through 404-3).

In certain instances, the user device may also determine and transmit a second downlink-quality report (e.g. the neighbor station downlink-quality report 604) to the second base station, where the second downlink-quality report is determined based on one or more downlink signals received from the second base station. The received one or more downlink signals may be comprised of any combination of a Downlink Control Information (DCI) signal, a Radio Resource Control (RRC) signal, a Channel State Information-Resource Information (CSI-RS) signal, or a Synchronization Signal Block (SSB) signal. Furthermore, in certain instances, the received one or more downlink signals received from the second base station may be multiple downlink signals received via multiple downlink beams formed by the second base station (e.g., the downlink beams 402-1 through 402-3). As such, the second downlink-quality report may include a Received Signal Strength Indicator (RSSI) metric, a Signal-to-Noise Ratio (SNR) metric, a distortion metric, a consistency metric, an intermittency metric, or a transceiver and MIMO antenna beamforming configuration.

The transmission of the first uplink signal and the second uplink signal is effective to cause the first base station and the second base station to negotiate handover parameters (e.g., the handover parameters 606 of FIG. 6) based, at least in part, on the transmitted first and second uplink signals. In certain instances, the negotiation may be further based on any combination of the first downlink-quality report and the second downlink-quality report.

At 806, the user device receives a handover command (e.g., the handover command 608 of FIG. 6) causing the negotiated by the first base station and the second base station, causing the user device to connect to the wireless operator network through the second base station in accordance with the negotiated handover parameters. The negotiated handover parameters may include, for example, data representative of allocated resources of the air-interface resource 502 (e.g., the resource units 504 FIG. 5) for use during a handover of a wireless connection, a beamforming configuration to be used by a transceiver (e.g., the transceiver 204) and a MIMO antenna array (e.g., the MIMO antenna array 202) of the user device during the handover of the wireless connection, a time for the handover of the wireless connection to be initiated, or the like.

Although aspects of a handover of a wireless connection based on downlink and uplink signal qualities have been described in language specific to features and/or methods, the subject of the appended claims is not necessarily limited to the specific features or methods described. Rather, the specific features and methods are disclosed as example implementations of a handover of a wireless connection based on downlink and uplink signal qualities, and other equivalent features and methods are intended to be within the scope of the appended claims. Further, various different aspects are described, and it is to be appreciated that each described aspect can be implemented independently or in connection with one or more other described aspects.

What is claimed is:

1. A method for handing over a wireless connection with a user device in a wireless network, the method comprising:
   receiving, by a first base station through which the user device is connected to the wireless network, a first downlink-quality report, the first downlink-quality report comprising at least one of a Received Signal Strength Indicator (RSSI) metric, a Signal-to-Noise Ratio (SNR) metric, a distortion measurement, a consistency metric, or an intermittency metric associated with one or more first downlink signals transmitted from the first base station to the user device;
   receiving, by the first base station and from the user device, one or more first Sounding Reference Signals (SRS);
   determining, by the first base station, a first uplink-quality report, the determining based on an evaluation of the first SRS;
   receiving, by the first base station and from a second base station, a second uplink-quality report associated with one or more second SRS that are associated with the user device;
   determining, by the first base station and based on a negotiation with the second base station using the first uplink-quality report associated with the first SRS, the second uplink-quality report associated with the second SRS, and the first downlink-quality report associated with the first downlink signals, handover parameters for a handover of the wireless connection, the handover parameters including:
      one or more of a time for the handover of the wireless connection to be initiated or resources for use by the user device in connecting to the wireless network through the second base station as part of the handover; and
      a beamforming configuration that the user device is to use to directionally form uplink transmission beams when connecting to the wireless network through the second base station; and
   transmitting, by the first base station and to the user device, a handover command including the handover parameters, the handover command directing the user device to connect to the wireless network through the second base station in accordance with the handover parameters.

2. The method as recited in claim 1, wherein at least one of the one or more first downlink signals is a Downlink Control Information (DCI) signal, a Radio Resource Control (RRC) signal, a Channel State Information-Resource Information (CSI-RS) signal, or a Synchronization Signal Block (SSB) signal.

3. The method as recited in claim 1, wherein the first downlink-quality report associates downlink signal qualities to each of a plurality of beams formed by the first base station, the plurality of beams being formed by the first base station for each of the one or more first downlink signals as part of a beam-sweeping operation.

4. The method as recited in claim 1, wherein the first uplink-quality report associates uplink signal qualities to each of a plurality of beams formed by the user device, the plurality of beams being formed by the user device for each of the first SRS as part of a beam-sweeping operation.

5. The method as recited in claim 1, further comprising determining, by the first base station, that a handover of the wireless connection between the first base station and the second base station will result in an increase in at least one quality metric of the wireless connection described in at least one of the first uplink-quality report, the second uplink-quality report, or the first downlink-quality report.

6. The method as recited in claim 1, wherein the negotiation with the second base station further uses a second downlink-quality report associated with one or more second downlink signals transmitted from the second base station to the user device.

7. The method as recited in claim 6, wherein the negotiation includes at least one of exchanging, with the second base station, the first and second downlink-quality reports and the first and second uplink-quality reports, weighting portions of the first and second downlink-quality and uplink-quality reports, or evaluating histories of the first and second downlink-quality and uplink-quality reports.

8. A user device comprising:
a transceiver; and
a processor and computer-readable storage media comprising instructions to implement a handover manager application, the handover manager application configured to cause the user device to:
determine a first downlink-quality report comprising at least one of a Received Signal Strength Indicator (RSSI) metric, a Signal-to-Noise Ratio (SNR) metric, a distortion measurement, a consistency metric, or an intermittency metric associated with one or more first downlink signals received from a first base station through which the user device connects to a wireless network through a wireless connection;
transmit, via the transceiver, the first downlink-quality report to the first base station;
transmit, via the transceiver, one or more first Sounding Reference Signals (SRS) to the first base station and transmit one or more second SRS that are associated with the user device to a second base station; and
receive, from the first base station and by transceiver, a handover command that includes handover parameters based on the first downlink-quality report, the first SRS, and the second SRS, the handover command directing the user device to connect to the wireless network through the second base station in accordance with the handover parameters, the handover parameters including:
one or more of a time for the handover of the wireless connection to be initiated or resources for use by the user device in connecting to the wireless network through the second base station as part of the handover; and
a beamforming configuration that the user device is to use to directionally form uplink transmission beams when connecting to the wireless network through the second base station.

9. The user device as recited in claim 8, wherein the first SRS comprises multiple SRS uplink signals transmitted via a plurality of uplink beams formed by the user device as part of a beam-sweeping operation.

10. The user device as recited in claim 8, wherein the second SRS comprises multiple SRS transmitted via a plurality of uplink beams formed by the user device as part of a beam-sweeping operation.

11. The user device as recited in claim 8, wherein the first downlink-quality report is determined based on one or more of a Downlink Control Information (DCI) signal, a Radio Resource Control (RRC) signal, a Channel State Information-Resource Information (CSI-RS) signal, or a Synchronization Signal Block (SSB) signal received from either or both of the first base station and the second base station.

12. The user device as recited in claim 8, wherein the handover manager application is further configured to cause the user device to transmit the first downlink-quality report to the second base station.

13. The user device as recited in claim 8, wherein the wireless network conforms to a 3rd Generation Partnership Project Long-Term Evolution (3GPP LTE) or Fifth-Generation New Radio (5G NR) protocol.

14. The user device as recited in claim 8, wherein:
the handover manager application is further configured to cause the user device to determine a second downlink-quality report comprising at least one of an RSSI metric, an SNR metric, a distortion measurement, a consistency metric, or an intermittency metric associated with one or more second downlink signals received from the second base station; and
wherein the negotiation with the second base station further uses the second downlink-quality report.

15. The first base station as recited in claim 8, wherein:
the handover manager application is further configured to cause the first base station to receive a second downlink-quality report comprising at least one of an RSSI metric, an SNR metric, a distortion measurement, a consistency metric, or an intermittency metric associated with one or more second downlink signals received from the second base station; and
wherein the handover parameters are further based on the second downlink-quality report.

16. A first base station comprising:
a transceiver;
an interface to a second base station; and
a processor and computer-readable storage media comprising instructions to implement a handover manager application, the handover manager application configured to cause the first base station to:
transmit, via the transceiver and to a user device that is connected to a wireless network via a wireless connection through the first base station, one or more first downlink signals;
receive, via the transceiver and from the user device, a first downlink-quality report, the first downlink-quality report comprising at least one of a Received Signal Strength Indicator (RSSI) metric, a Signal-to-Noise Ratio (SNR) metric, a distortion measurement, a consistency metric, or an intermittency metric associated with the first downlink signals;
measure, via circuitry of the transceiver, a signal strength of a first Sounding Reference Signal (SRS) received from the user device;
determine a first uplink-quality report based on the measured signal strength of the received first SRS from the user device;
receive, through the interface to the second base station and from the second base station, a second uplink-quality report associated with a second SRS that is associated with the user device;
negotiate, with the second base station through the interface to the second base station and based on: the first uplink-quality report associated with the first SRS, the second uplink-quality report associated with the second SRS, and the first downlink-quality report associated with the first downlink signals, handover parameters for a handover of the wireless connection to the second base station, the handover parameters including: a beamforming configuration that the user device is to use to directionally form uplink transmission beams when connecting to the wireless network through the second base station and one or more of a time for the handover of the wireless connection to be initiated or resources for use by the user device in connecting to the wireless network through the second base station; and
transmit, to the user device via the transceiver, a handover command that includes the handover parameters, the transmission of the handover command directing the user device to connect to the wireless network through the second base station in accordance with the handover parameters.

17. The first base station as recited in claim 16, wherein the first base station supports uplink and downlink communications with the user device via a wireless link that conforms to a 3rd Generation Partnership Project Long-Term Evolution (3GPP LTE) or Fifth-Generation New Radio (5G NR) protocol.

18. The first base station as recited in claim 16, wherein the interface to the second base station is an Xn interface.

19. The first base station as recited in claim 16, further comprising a Multiple Input and Multiple Output (MIMO) antenna array.

20. The first base station as recited in claim 19, wherein the MIMO antenna array is configurable for beamforming and beam-sweeping.

\* \* \* \* \*